(12) United States Patent
Sisley

(10) Patent No.: US 7,747,422 B1
(45) Date of Patent: Jun. 29, 2010

(54) USING CONSTRAINT-BASED HEURISTICS TO SATISFICE STATIC SOFTWARE PARTITIONING AND ALLOCATION OF HETEROGENEOUS DISTRIBUTED SYSTEMS

(76) Inventor: Elizabeth Sisley, P.O. Box 25768, Woodbury, MN (US) 55125-0768

( * ) Notice: Subject to any disclaimer, the term of this patent is extended or adjusted under 35 U.S.C. 154(b) by 1032 days.

(21) Appl. No.: 09/688,006

(22) Filed: Oct. 13, 2000

Related U.S. Application Data

(60) Provisional application No. 60/159,240, filed on Oct. 13, 1999.

(51) Int. Cl.
G06F 17/50 (2006.01)

(52) U.S. Cl. .............. 703/13; 703/22; 718/104

(58) Field of Classification Search ............ 703/21, 703/22, 13; 709/226; 717/135; 718/104
See application file for complete search history.

(56) References Cited

U.S. PATENT DOCUMENTS 6,542,926 B2 * 4/2003 Zalewski et al. ............ 709/213
6,675,155 B2 * 1/2004 Sasagawa et al. ............ 706/13

OTHER PUBLICATIONS

Gomaa, H.; "Structuring and configuring distributed applications", Configurable Distributed Systems, 1992., International Workshop on, Mar. 25-27, 1992, pp. 18-32.*
Magee, J.; Kramer, J.; Sloman, M.; "Constructing distributed systems in Conic", Software Engineering, IEEE Transactions on, vol. 15, Issue: 6, Jun. 1989, pp. 663-675.*

Gomaa, H.; Farrukh, G.A; "Automated configuration of distributed applications from reusable software architectures", Automated Software Engineering, Nov. 1-5, 1997, pp. 193-200.*
Gomaa, H.; Farrukh, G.A.; "Methods and tools for the automated configuration of distributed applications from reusable software architectures and components", Software, IEE Proceedings-, vol. 146, Iss:6, Dec. 1999, pp. 277-290.*
Morzenti, A.; Pietro, P.S.; Morasca, S.; "A tool for automated system analysis based on modular specifications", Oct. 1998 pp. 2-11.*
Jelly, I.E.; Gorton, I.; Burkhart, H.; Decker, K.M.; Fekete, A.; Potter, J.M.; Gomaa, H.; Kramer, J.; Schmidt, D.C.; Stankovic, J.A.; "Software engineering for parallel and distributed systems Concurrency", IEEE,vol. 5, Iss: 3, Jul.-Sep. 1997, pp. 16-27.*

* cited by examiner

Primary Examiner—Kamini S Shah
Assistant Examiner—Herng-Der Day
(74) Attorney, Agent, or Firm—Schwegman, Lundberg & Woessner, P.A.

(57) ABSTRACT

Systems and methods automatically design a system's architecture by modeling the architectural complexity of large-scale distributed systems to drive a partitioning and allocation algorithm. The result is a configuration based on the structure of the software tasks and data access, and the capacities of the hardware. Coupling and cohesion are relative, dependent on the ratio of load to capacity, and not independent software characteristics. The partitioning and allocation algorithm includes tradeoffs between processor utilization, memory utilization, inter-processor communication, and peripheral contention. The systems and methods take into account both precedence constraints and the directional flow of data. Further aspects include interleaving the decisions of database segmentation and software distribution. This approach is demonstrated with a simplified example of a real distributed system.

10 Claims, 8 Drawing Sheets

$TT_{i\to j} + TT_{j\to k}$                $TTi\to j + TTj\to k + TT_{k\to j} + TT_{j\to i}$ $DT_{j\to i}$                $TD_{i\to j}$ AND $DT_{j\to n}$

USING CONSTRAINT-BASED HEURISTICS TO SATISFICE STATIC SOFTWARE PARTITIONING AND ALLOCATION OF HETEROGENEOUS DISTRIBUTED SYSTEMS

RELATED FILES

This application claims the benefit of U.S. Provisional Application No. 60/159,240, filed Oct. 13, 1999, which is hereby incorporated by reference herein for all purposes.

FIELD

The present invention relates generally to computerized distributed systems development, and more particularly to computerized systems and methods for determining the grouping and allocation of software and data in a distributed systems environment.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©1999, 2000, Elizabeth Marie Sisley. All Rights Reserved.

BACKGROUND

As computer software and hardware has evolved, there has been an increase in the availability of multiple processor systems and an increase in connectivity between systems achieved by high-speed networks. This in turn has led to the increased development of distributed systems. Compared to other software development efforts, a key distinction of heterogeneous distributed systems is their variety of components. Each distributed system is unique, and can consist of a diverse combination of: multiple platforms, databases, or types of interfaces; geographical distribution; legacy, off-the-shelf, and custom components; etc. Many large distributed systems are built by adding new components onto legacy applications, or integrating new and existing components in ways not planned by the initial component designers.

This variety of components also introduces a variety of performance patterns. Multimedia applications will often be I/O-bound, while other components may have peripheral, memory, or network bottlenecks. Thus different parts of a large system may have significantly diverse bottlenecks. One of the architectural challenges consists of identifying changes in the performance, and potential bottleneck shifts, caused by adding a new component to an existing distributed system.

Large-scale distributed systems also typically have performance and reliability requirements that are more stringent than other types of software. A distributed system can have hundreds or thousands of users accessing it through several types of interfaces, as in a corporation's customer information database. Another distributed system may need to combine and calculate knowledge from a variety of sensors to support hard-real-time decision-making, as in a command-and-control weapons system. One of the most difficult situations occurs when an existing system must be scaled up and integrated with other existing systems at the same time, as when a departmental application is incorporated into the other systems that support an entire organization.

The usefulness of distributed systems is due primarily to six characteristics: resource sharing, openness, concurrency, scalability, fault tolerance, and transparency . . . . It should be noted that they are not automatic consequences of distribution; system and application software must be carefully designed in order to ensure that they are attained.

When designing a distributed system, there are architectural decisions that determine how the software is mapped to the hardware, resulting in a system configuration. These decisions must be made early in the development cycle of a large system, and they have a significant impact throughout the lifetime of the distributed system. An inappropriate architecture may be difficult to implement, have poor performance or scaling problems, and/or be hard to maintain.

The analysis and design of a system configuration typically has two primary steps, partitioning and allocation. Partitioning determines how to group the data and processes into components that have high cohesion and low coupling, and allocation determines how the components are mapped to the available hardware suite. One method of partitioning the system, functional decomposition, focuses totally on the system's functionality as the criteria for modularity. Functional decomposition, however, often results in systems with poor performance caused by ignoring the other design criteria. In particular, the practice of applying functional decomposition to determine the component boundaries does not provide a good guideline for allocating across a network. For example, minimizing network traffic or considering the impact of network latency on real-time requirements result in better divisions between local and remote access, than does dividing along functional boundaries.

In general, the partitioning process starts with a distributed system's individual units of code and data, and results in the system's logical view, the application architecture. The allocation process generates its physical view, the system architecture or system configuration. The logical view shows the functional sub-applications and their inter-communication and external integration, independent of how these functional entities relate to the actual components that implement the functionality. The physical view shows the actual components and how they are mapped to the hardware suite, including replication. The process of defining the logical view and transforming it into the physical view is a major part of defining the architecture of a distributed system.

While good software design is just as important as when building smaller applications, designing the system configuration, or architecture, becomes more important as the application increases in system-level complexity. In contrast to small software packages where several applications may run on a single processor (PC or workstation), distributed systems contain a complexity at the structural level, completely aside from the algorithms they implement.

Many of these configuration decisions are frequently made early in the development cycle of large systems. Doing configuration analysis and design early in the development/integration cycle minimizes the risk that the distributed system will perform poorly, either at initial roll-out or at major change points during the system's production and maintenance phases. The design decisions not only have a significant impact on performance, but the data and process locations impact each other in a recursive fashion. However, postponing the configuration decisions is possible only when the application components are developed with good modularity:

there are many legacy systems that consist of a single monolithic component for each platform, no matter what comprises the hardware suite.

Configuration decisions are also based on conflicting goals, and the tradeoffs are often not obvious in a complex system. For example, network traffic is lowered by minimizing inter-processor communication (IPC), but may be increased by maximizing throughput. Predicting when a different configuration would improve a particular system's performance is not easy, nor is it always clear what changes would improve a specific application.

Architectural paradigms, such as 3-tier client/server and X-windows, have been developed to simplify the decision-making involved in distributed system design, but the adoption of a particular paradigm does not necessarily provide a satisfactory configuration for a specific application. In addition, these paradigms were developed to address the performance issues, but they are often inadequate beyond a certain size or complexity of distributed system. Predicting when a different configuration would improve a particular system's performance is not easy.

Commercial tools, such as Forte, that automate the generation of communication code still require developers to manually decide on the mapping and provide this information to the tool, via drag-and-drop. Manually attempting to analyze the tradeoffs is a difficult task for a system of any complexity and scale.

Commercial tools implementing UML (Unified Modeling Language), such as Rational Rose™, allow for manual partitioning and allocation steps, and represent the results. However, neither the standard nor the supporting tools provide an automated process for determining the component diagrams or the deployment diagrams.

As a result, there is a need in the art for the present invention.

SUMMARY

The above-mentioned shortcomings, disadvantages and problems are addressed by the present invention, which will be understood by reading and studying the following specification.

The present invention defines a method for automating the design of a system configuration by using the architectural complexity of large systems to drive a partitioning and allocation method. Modeling a system to identify both general resource requirements and bottlenecks during the design phase results in a configuration based on the actual structure of the software and the capacities of the hardware. The configuration models both average load and worst-case load to predict performance. Graceful degradation is achieved via reactive re-configuration, combining the benefits of thorough planning with low dynamic overhead.

The systems and methods of the invention can be applied to complex problems of system configuration that exist during the initial architectural design of large-scale distributed systems, and also whenever an existing system must be re-architected, due to migration, re-hosting, or integration with another system.

In some embodiments of the invention, a method begins with the information contained in the initial representation of the distributed system: the domain entities and their attributes. Additional attributes are calculated from this initial information, and added to the domain model. Potential system bottlenecks and couplings are calculated, and then the partitioning process begins with a pre-partitioning and pre-allocation process that uses initial system constraints. Preparations completed, the partitioning process then creates the components, and the allocation process maps them to the hardware suite. These steps result in a configuration based on the initial system information, showing the architect/systems engineer the impact of the early estimates and decisions. When the configuration identifies problems, the method traces back to the data that drove the decision process.

Various embodiments of the invention implement a method for designing a heterogeneous distributed system's configuration by populating a generic model with the specifics of both the hardware and software entities of the system being designed. This model then drives a partitioning and allocation algorithm that compares the software needs against the hardware capacities, prioritizes based on system bottlenecks, and generates a resulting configuration.

One aspect of the invention is that the generic model of the distributed system entities and their attributes provides extensible representation by modeling the system subcomponents as entities with attributes, and encapsulating the constraints.

A further aspect of the system is that interleaving of database and application partitioning/allocation design of the layout of distributed databases and their applications iterates between initially planning the database segmentation and locations, then planning the application partitions and mapping based on the distributed data. Next comes readjustment of the data mapping to incorporate changes driven by the application distribution, often causing another iteration. After the system is built and integrated, changes are often needed to improve performance, or even to allow the system to execute at all.

A still further aspect of the system is that analysis of the system is performed at a finer level of granularity. Representation of data as logically cohesive groupings allows data flow and control flow to equally drive the decisions, supporting an interleaving of the database and application mapping. Prioritizing the interconnections based on load-to-capacity ratios helps prevent bottlenecks. This level of granularity also avoids both the confusion of considering data at the element level and the inflexibility of planning at the database level.

In yet another aspect of the system, it is possible to generate a target hardware suite for a specific software application, based on descriptions of available hardware components.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
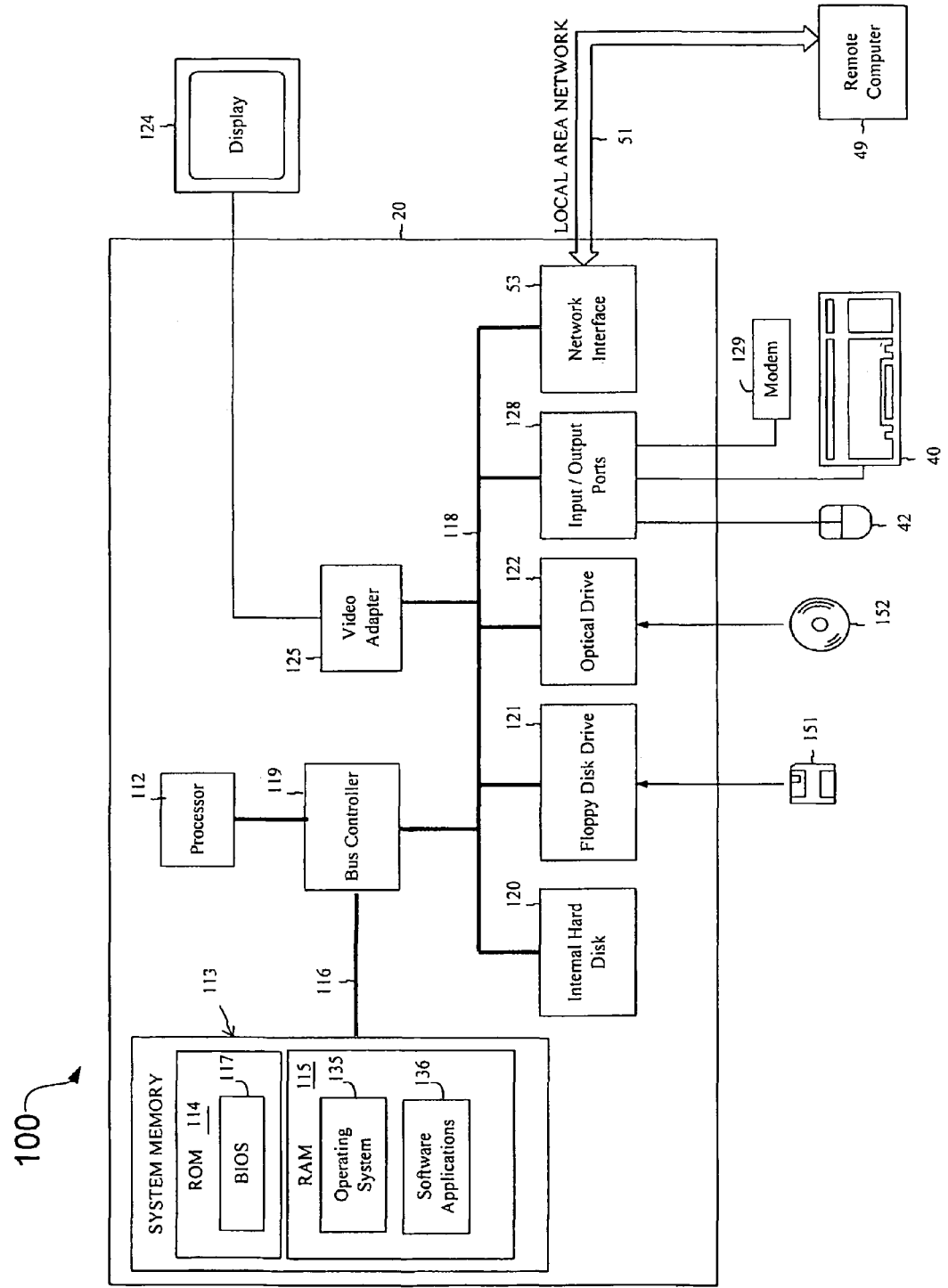
FIG. 1 is a diagram illustrating an exemplary hardware configuration in which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the methods of varying embodiments of the invention is described. In the final section, a conclusion is provided.

DEFINITIONS

This specification uses the term component in the Unified Modeling Language (UML) sense, where components are types of distributable pieces of implementation of a system, such as source, binary or executable elements of software. Allocation can also be referred to as deployment. In an object-oriented system, components contain the classes and objects, while in traditional systems they contain tasks and data.

In addition, this specification uses the term "satisficing." Herbert Simon coined the term "satisficing" to describe techniques that look for good or satisfactory solutions instead of optimal ones (Herbert A. Simon. *The Sciences of the Artificial*, MIT Press, Third Edition, 1996, p. 119). Simon also clarified the situations where satisficing is a useful technique, including engineering design problems where optimal search is computationally infeasible. This can be coupled with the systems engineering/architecting view that optimal configurations are usually not a goal, that just developing one that works is hard enough.

A satisficing approach also applies to problems where the available information is either estimated or partial, where going through the effort of generating an optimal solution doesn't really provide a final solution. In the early design phase, much information cannot be available since the system has not yet been built. Thus the frequent situation that arises where integration and system tests are needed to determine if the system will actually have acceptable performance. Having a satisficing method provides initial feedback on the viability of the design decisions much earlier than the final acceptance test.

In addition, the following terms, described in Table 1, are used in this specification.

TABLE 1

Terms

| Term | Definition |
|---|---|
| Allocation | The process of mapping the software components to the hardware platforms. |
| Capacities | Available hardware resources. |
| Cohesion | A measure of the strength of interconnection between one module and another. |
| Coupling | The degree of functional relatedness of processing elements within a single module. |
| Component | Each set (in a partition) of one or more software tasks and data blocks. The partitioning process determines component boundaries. |
| Control Coupling | Measurement of the direction and strength of the precedence relations. |
| Data Blocks | Data will be represented as data elements grouped by usage. |
| Data Coupling | Measurement of the direction and strength of what will become (after Partitioning and Allocation) the interprocessor and intraprocessor communications. |
| Load | Static resource requirements of tasks, data blocks, and communication at both average and worst-case usage. |
| Entity | A task, a data block, a peripheral, a processor, or a network link modeled as part of this method. |
| Module | A functional unit of the software system, identified via functional decomposition. |
| Partitioning | The process of deciding which software entities (tasks and data), should be kept together to minimize bottlenecks, and which entities can be separated into different components. |
| Partition | A set of mutually disjoint and exhaustive components, representing an entire distributed system. |
| Peripheral Coupling | Measurement of the direction and strength of peripheral dependencies. |
| Software Model | Represents the system at the task level (e.g., control & data flow, precedence, parallel/pipeline/concurrent structure, etc.). |
| System | The real-world heterogeneous distributed system that is to be partitioned and allocated. |
| Task | A software entity at a user-chosen level. The smallest size is an independently schedulable unit of software. |

Hardware and Operating Environment

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 1, the computing system 100 includes a processor. The invention can be implemented on computers based upon microprocessors such as the PENTIUM® family of microprocessors manufactured by the Intel Corporation, the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computing system 100 represents any personal computer, laptop, server, or even a battery-powered, pocket-sized, mobile computer known as a hand-held PC.

The computing system 100 includes system memory 113 (including read-only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computing system 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

A user enters commands and information into the computing system 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computing system 100 also includes a modem 129. Although illustrated in FIG. 1 as external to the computing system 100, those of ordinary skill in the art will quickly recognize that the modem 129 may also be internal to the computing system 100. The modem 129 is typically used to communicate over wide area networks (not shown), such as the global Internet. The computing system may also contain a network interface card 53, as is known in the art, for communication over a network.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computing system 100 is stored in ROM 114 and is loaded into RAM 115 upon booting. Those skilled in the art will recognize that the BIOS 117 is a set of basic executable routines that have conventionally helped to transfer information between the computing resources within the computing system 100. These low-level service routines are used by operating system 135 or other software applications 136.

In one embodiment computing system 100 includes a registry (not shown) which is a system database that holds configuration information for computing system 100. For example, WINDOWS® 95, WINDOWS 98®, WINDOWS® NT, and WINDOWS 2000® by Microsoft maintain the registry in two hidden files, called USER.DAT and SYSTEM.DAT, located on a permanent storage device such as an internal disk.

Methods

In this section, the particular methods of the invention performed by an operating environment executing an exemplary embodiment are described by reference to a flowchart shown in FIG. 2. The methods to be performed by the operating environment constitute computer programs made up of computer-executable instructions that can execute on computer such as those described in the previous section. Describing the methods by reference to a flowchart enables one skilled in the art to develop such programs including such instructions to carry out the methods on suitable computers (the processor of the computer executing the instructions from computer-readable media). The method illustrated in FIG. 2 is inclusive of the acts required to be taken by an operating environment executing an exemplary embodiment of the invention.

Figure 2:
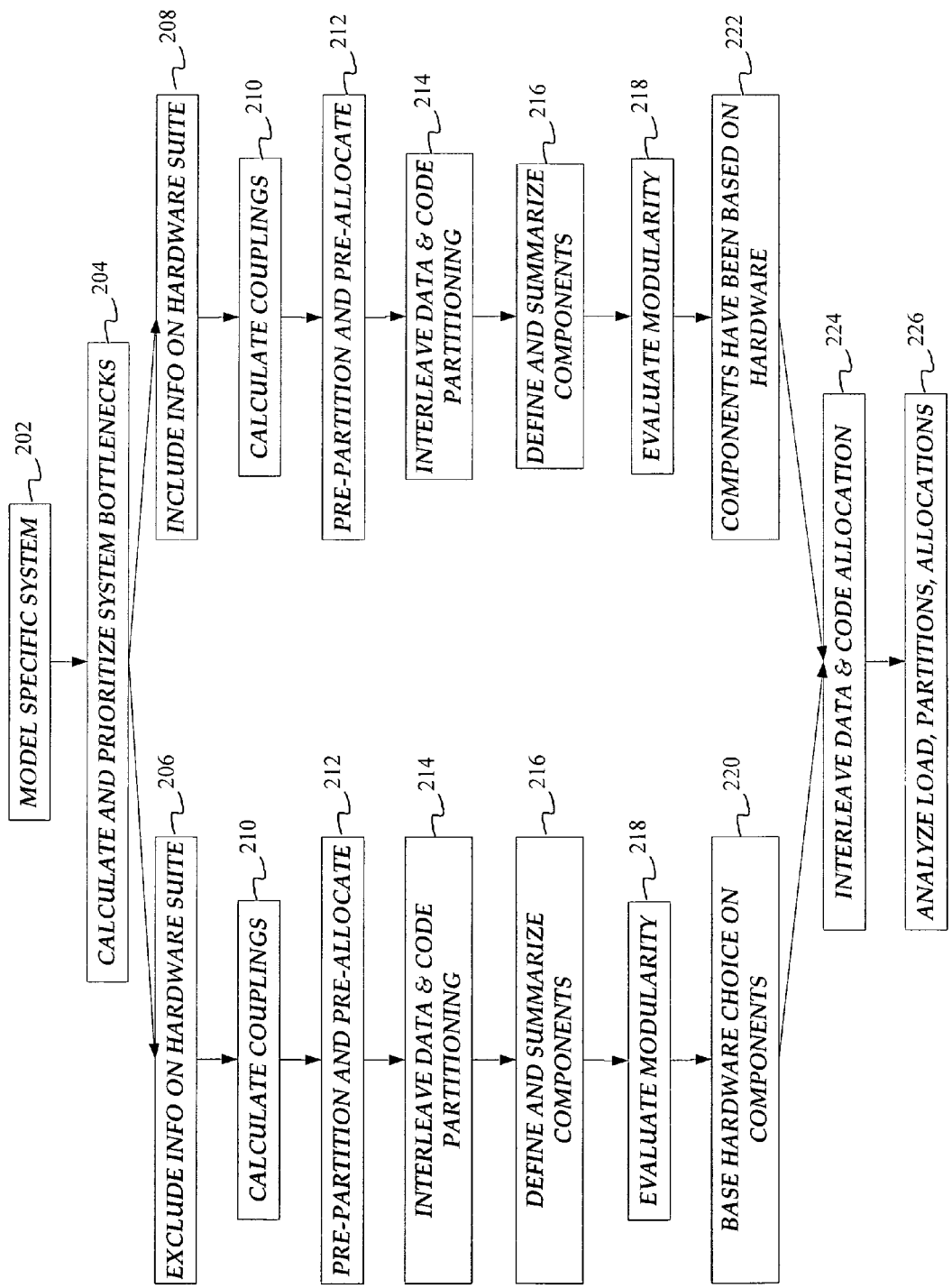
FIG. 2 is a flowchart illustrating a method according to an embodiment of the invention.

An example method for performing component partitioning and allocation according to an implementation of the present invention is shown in FIG. 2. One goal commonly sought by partitioning a software system is to group the tasks and data blocks into components that are internally cohesive and have relatively low external couplings. An upper limit on component size is the capacity of the largest hardware unit available. The existence of even a few small components simplifies the allocation's bin-packing process.

The design goals, listed in Table 2, that lead to an effective distributed system configuration are a set that contain inherent conflicts, and a "good" configuration needs to strike a balance between them. Analysis of these goals and the characteristics of distributed systems resulted in a mapping between the goals and the characteristics. This mapping allows the model, representing the details of a specific system, to drive the partitioning and allocation algorithms in a way that compares and prioritizes the tradeoffs between the goals.

TABLE 2

Distributed System Design Goals

Maximize Processor Utilization
Maximize Memory Utilization
Minimize Peripheral (I/O) Contention
Minimize Interprocessor Communication
Maximize Real-Time System Performance
Maximize Reconfigurability In general, the method evaluates factors that impact overall distributed system performance, including processor and memory utilization, precedence constraints, network communication traffic, and peripheral access. The method then calculates and prioritizes the various requirements of a specific distributed system to automate construction of that system's architectural structure. This construction process is based on balancing the software load against the hardware capacities, prioritizing on the most-likely potential bottlenecks.

The method begins when a system executing the method receives a model for the system to be configured. (block 202). The model specifies the generic objects and their attributes that are relevant to distributed systems. The generic domain model includes several types of information: the actual domain entities and their attributes; the detailed characteristics needed to address the design goals; and the system constraints. In one embodiment of the invention, a systems engineer/architect provides actual details or estimates (as available) of the system being built. In alternative embodiments, model data can be read from existing modeling tools, code analyzers, or other software tools.

The model can comprise partial data, and the object-oriented domain model supports extensions. In fact, the model can be built incrementally, first tested with a representation of tasks and control flow, with additional details being added later.

In one embodiment, the domain model represents each of the entities of the distributed system as individual tasks, data blocks, peripherals, processors, and networks. Specific attributes and their values of each of these entities are also represented as attributes, as shown in Table 3. Entity names are identified here as variables (e.g., Ti), but the model of an actual system can specify the real task name. Records of the specific data elements that are grouped are retained into each data block.

TABLE 3

Domain Entities and Their Attributes

| Entity | Attribute | Representation |
|---|---|---|
| Task | name | $T_i$ |
| | response time | RST |
| | frequency | FQ |
| | execution time | ET |
| | processor utilization | PU |
| Control Flow | precedence constraints | control flow from $T_i$ to $T_n$ |
| | required response time | RST |
| | return receipt (rendezvous communication) | RR |
| | latency (delay time) | LT |
| | frequency | FQ |
| | timing strength | TS |
| | frequency strength | FS |
| | control coupling | CC |

TABLE 3-continued

Domain Entities and Their Attributes

| Entity | Attribute | Representation |
|---|---|---|
| Data Block | name | $D_j$ |
| | size | SZ |
| | identity of grouped elements (for traceability purposes) | list |
| Data Flow | size of data passed, not size of total data block (unless total is passed) | DSize |
| | access time to get data | AT |
| | frequency | FQ |
| | timing strength | TS |
| | frequency strength | FS |
| | bandwidth strength | BS |
| | data coupling | DC |
| Peripheral (auxiliary memory, I/O device, ...) | name | $R_k$ |
| | bandwidth | BW |
| Peripheral Flow | peripheral input, from Rk to Ti | $RT_{k \to i}$ |
| | peripheral output, from Ti to Rk | $TR_{i \to k}$ |
| | latency (delay time) | LT |
| | frequency | FQ |
| | data size | DSize |
| | timing strength | TS |
| | frequency strength | FS |
| | bandwidth strength | BS |
| | peripheral coupling | RC |
| Processor | name | $P_m$ |
| | speed | SP |
| | main memory | MM |
| | auxiliary memory | AM |
| Network | name | $B_p$ |
| | bandwidth | BW |

In addition to modeling domain elements, the model includes the characteristics necessary to meet each of the goals originally listed in Table 2. An example of such characteristics are itemized below in Table 4, and categorized for each goal.

TABLE 4

Distributed System Goals and Related Characteristics

| Goal | Characteristic |
|---|---|
| Processor Utilization | processor types in the heterogeneous system |
| | control flow |
| | processor utilization of each task for each applicable processor type |
| | number of processors available |
| | utilization patterns (time, memory, types of resources) |
| Memory Utilization | data flow |
| | memory utilization of each task for each applicable processor type |
| | number of processors available of each processor type, & their capacities |
| | peripheral storage devices available |
| Peripheral (I/O) Contention | peripheral dependencies |
| | data flow |
| | available peripherals |
| | location of data files |
| | location of peripherals (i.e., directly on bus or to a particular processor) |
| Interprocessor Communication | data flow |
| | control flow |
| | bus bandwidth and speed capacity |
| | directional flow (applicable if the bus communication is non-uniform) |

TABLE 4-continued

Distributed System Goals and Related Characteristics

| Goal | Characteristic |
|---|---|
| Real-Time System Performance | critical timing:<br>external communications (i.e., peripheral dependencies)<br>internal communications (i.e., bus travel time vs. software response time)<br>input and output data access<br>processing (i.e., execution time vs. required completion time)<br>positive & negative pre-partitioning and pre-allocation<br>processor utilization<br>load balancing on the utilization<br>memory utilization<br>utilization patterns (time, memory, types of resources) |
| Reconfigurability | all of the above, plus:<br>task expendability by mission<br>unique identity of each processor, peripheral, task, and data file<br>processor reliability, (individual, by type, or by location) |

In addition, system constraints can be embedded within this model because this is a domain-specific approach, custom-designed for the software engineering task of architecting distributed systems.

In one embodiment of the invention, the types of constraints represented in the domain model are the couplings, the ratios of software loads to hardware capacities, and the thresholds that drive the component boundaries and the split between local/remote communication. In a particular embodiment, three types of couplings are included: control, data, and peripheral.

The control couplings represent both the precedence constraints and the degree of connectivity between tasks. The connectivity is a factor of both worst-case timing and frequency of invocations, since the analysis is on the system's static structure, not its dynamic behavior.

The data couplings represent the data access at an abstract level. Therefore, the data is represented as data blocks, not as messages or data elements or large databases. These blocks are defined initially as sets of data elements that are expected to have similar usage patterns. If bottlenecks are discovered, the data blocks can be analyzed and potentially re-grouped. Then when the architecture has resulted in a good configuration, these data blocks can be implemented as appropriate.

The peripheral couplings represent the peripheral needs of each task, and the strength of the coupling is based on volume, frequency, and real-time requirements. Peripherals are either attached to specific processors or directly to the network. Ethernet would provide uniform access, while a ring bus would need to include a specific location. Examples of such couplings include positive and negative pre-partitioning and allocation.

Positive pre-partitioning represents the requirement that two tasks (or a task and a data block) must be kept together, independent of which processor they reside on.

Negative pre-partitioning also impacts allocation, since it indicates that two tasks must be kept apart, possibly for reliability reasons.

Positive pre-allocation indicates that a task must be resident on a specific processor, while negative pre-allocation identifies a task that cannot be allocated to that processor Those of skill in the art will appreciate that other types of couplings are possible and within the scope of the invention.

The strengths of these couplings can be either heuristic or calculated values that are used to quantify various attributes of the component interconnections, such as frequency, timing, and bandwidth. At the early stages in distributed system development, these values can be based on prior experience or estimates. Sources include comparison with other systems that have similar components, known capacities of the peripherals, domain knowledge of the application, or best judgment of the system architect. As the development lifecycle progresses, the accuracy of these values is iteratively improved by adding actual measurements to the model.

The values can be normalized on a scale of 1 to 10, where a value of 10 represents a very tight coupling. However, the invention is not limited to such a scale, and in alternative scaled are within the scope of the invention. In one embodiment, the lack of connection is simply excluded from the model, significantly reducing the number of combinations to track.

The couplings can be represented as ordered lists of three items: the initiator, the receiver, and the coupling value. An example is the control coupling (A1 A2 9), or the data coupling (T1 D3 7). These ordered lists are referred to as triples. Table 5 below illustrates the coupling using the exemplary configuration illustrated in FIG. 4.

TABLE 5

Coupling Matrix

| Strength | Control Couplings | Data Couplings | Peripheral Couplings |
|---|---|---|---|
| 10 |  | (F1 N1 10)<br>(A1 M1 10) | (Fore-Sonar F1 10)<br>(Aft-Sonar A1 10) |
| 9 | (A1 A2 9)<br>(F1 F2 9) | (N1 F3 9)<br>(B2 S2 9)<br>(M1 A3 9)<br>(D2 T1 9) | (Fore-Sonar B1 9)<br>(Aft-Sonar B1 9) |
| 8 | (A2 A4 8)<br>(A3 A4 8)<br>(F2 F4 8)<br>(F3 F4 8) | (B3 T1 8) | (Keyboard D1 8) |
| 7 |  | (N3 B2 7)<br>(M3 B2 7)<br>(T1 D3 7) | (D3 Display-1 7)<br>(D3 Display-2 7) |
| 6 | (A4 B2 6)<br>(B2 B3 6)<br>(F4 B2 6)<br>(D1 D3 6) | (M1 A2 6)<br>(M2 A4 6)<br>(S1 B3 6)<br>(N1 F2 6)<br>(N2 F4 6) |  |
| 5 | (B1 B3 5)<br>(B3 D1 5)<br>(D3 B3 5) | (A3 M5 5)<br>(F3 N2 5) |  |
| 4 |  | (A4 M3 4)<br>(B1 S1 4)<br>(D1 T1 4)<br>(F2 N2 4)<br>(A2 M2 4)<br>(F4 N3 4) |  |
| 3 |  | (S2 B3 3) |  |
| 2 |  |  |  |
| 1 |  |  |  |

The thresholds clarify the breakpoint between high cohesion and low coupling, thus identifying the component boundaries. These boundaries also provide the distinction between remote and local access, since it is desirable that highly cohesive entities certainly be collocated.

The system capacities for processor and memory utilization are also included in the model, as they provide a guideline to anticipate balance between available capacities and loads. Within each cell, the set of triples is sorted according to their ratios on the system capacities. The coupling values are contained within each triple simply to clarify references, such as (A1 A2 9).

Also based on the bottleneck ratios, thresholds are selected for each of the three coupling types: control threshold (CT), data threshold (DT), and peripheral threshold (PT). These thresholds represent the dividing point, which in one embodiment is on a 1-10 scale, above which the tasks and/or data are grouped into the same component. A higher bottleneck ratio translates into a lower threshold, so that even a low coupling value would be included in aggregating the components.

A pair of entities that have a coupling value below the threshold defines them to be sufficiently modular to allow the aggregation decision to be based on other factors. Thus the thresholds identify the dividing line on the range of connectedness from high coupling to low coupling, and result in the component boundaries. Within the components, coupling is high enough to require local communication, and between the components, couplings are low enough to support remote communication.

In some embodiments, the domain model uses a simple encoding to represent each unit (task, data block, processor, etc.) as an entity, with attributes capturing each entity's details.

As part of the domain modeling of a specific distributed system, any initial attributes must be part of the input (if they are applicable to that system), since they can't be calculated. If any of the initial attributes are unknown, the automated design process simply ignores the missing information and bases the calculations on the attributes that are available. For example, if there is no representation of data flow, IPC is calculated based solely on control flow.

The task load information needed consists of execution and memory loads for each software task on each available platform. The task relationships (precedence constraints) and their attributes (frequency and required response time) are also needed for each task. These values are independent of the hardware.

The memory utilization details consist of memory utilization for the individual data blocks, and connections (data flow) to the appropriate software tasks including direction (read vs. write), frequency, required response time, and data size.

Since the coupling strength is relative to the network capacity, a formula for comparing the actual software communication (data and control flow, peripheral I/O) helps automate the model. Using a step function to identify endpoints and the average network capacity, mapping them to the extremes of the coupling scale (1-10 in some embodiments), and scaling the middle values, provides a technique for comparing communication strengths. Independently calculating timing, frequency, and bandwidth supports more precise modeling. These are shown in Table 6.

TABLE 6

Calculating Communication Strengths

| Step Function | Maximum (=10) | Average (=5) | Low = (1) |
|---|---|---|---|
| Timing | if Time < minimum | if Time = average | if Time > maximum |
| Frequency | if frequency > maximum rate of small messages on bus | if frequency = average rate of small messages on bus | if frequency <= minimum rate of small messages on bus |
| Bandwidth | if data size > maximum bus capacity | if data size = average bus capacity | if data size <= minimum bus capacity |

Although obviously a much more accurate partition and allocation of the system results if all of the initial attributes are represented in the domain model, it is desirable for the method to be able to evaluate the information that is available. This feature enables the use of the design method during the early stages of the development cycle, when not all of the information is known by the systems engineers, and much of the input values may be estimates. Providing a satisficing solution with partial data allows this design method to be used throughout the proposal, requirements analysis, and high level design phases, as well as after the entire system design is completed.

In order to account for situations where not all information is initially available, the model includes derived attributes. The derived attributes represent system information that either is not available initially, such as the coupling strengths, or is easier to calculate for tradeoffs, such as memory utilization when data block size is known and a variety of capacities are available. If initial system functionality is still being estimated, it may be easier to estimate a task's processor utilization for each available processor, than it is to estimate the task's code size and then calculate execution time.

Thus the method flexibly handles representation at either extreme, as well as a mixture of both extremes for a specific distributed system. For example, an existing database may support a new application, resulting in detailed information about the data, and estimated information about the new tasks.

After the system has been modeled, the method then proceeds to calculate and prioritize the system bottlenecks (block 204). In order to determine the overall system bottleneck(s), a ratio of total load (both worst case and average) divided by total capacity, is calculated for each of the following: CPU, memory, network traffic (IPC), and peripheral. In one embodiment, these ratios are ordered, and used to drive the priorities of the partitioning and allocation algorithms.

The system capacities for processor and memory utilization are used to anticipate balance between capacities and loads.

The capacity needs of the tasks and/or data blocks for each coupled pair are summed to enable the method to prioritize the couplings that have the same value. In one embodiment of the invention, the following algorithm is used:

1. Calculate for the total system:

$$ProcessorRatio = \left(\sum_{i=1}^{n} U_i[PU]\right) \bigg/ \left(\sum_{k=1}^{m} C_k[PC]\right)$$

$$MemoryRatio = \left(\sum_{i=1}^{n} U_i[MU]\right) \bigg/ \left(\sum_{k=1}^{m} C_k[MC]\right)$$

2. Loop through all triple lists (CONTROL.cc, DATA.dc, and RESOURCE.rc): ;; Then since the tighter constraint is more important:
   2.1 Sort triple list (PU or MU) by max[processor.ratio, memory.ratio].
      2.1.1 Within this sorted list, for each set of triples where max[processor.ratio, memory.ratio] is equal,
         2.1.1.1 sort this subset of triples by min[processor.ratio, memory.ratio].
End A distributed system that has only one high (close to 1.0) ratio can be optimized fairly easily, while a system with all high ratios should be evaluated for additional hardware/network capabilities. These ratios indicate the potential flexibility to make architectural tradeoffs, not necessarily a guarantee of performance. For example, a system with an IPC ratio of 0.5 should consume only half of the network bandwidth. If a ring bus is used, a poor allocation could still result in most messages needing many hops, thus potentially saturating the network.

Separating the IPC into control flow and data flow supports analysis of the placement of both the software processes and the data blocks. Deferring the grouping of the data blocks into sub-units of a distributed database supports an analysis of the system where the data coupling priorities are interleaved with the task and peripheral coupling priorities. Some of the data blocks may be better implemented into one or more databases, while other data blocks are effectively implemented via messages or in shared memory. The algorithmic process identifies the usage patterns that should be considered when choosing implementation strategies, giving guidelines to design choices.

Again, estimates may be made of those details not yet known, and the data-driven algorithm simply considers the available information. For example, if the system's memory utilization was unknown (and thus not represented in the model), the resulting configuration would be generated without memory constraints. Then memory can be installed as needed to satisfy the system requirements. If memory requirements exceed the hardware limits, that knowledge can be added to the model, and the algorithm can be re-processed. Details can be added to the model throughout the development cycle, fine-tuning the accuracy of the recommended configuration.

The available system details generate a configuration that models the distributed system, calculating potential system bottlenecks from the load to capacity ratios.

After system bottlenecks have been calculated, a choice can be made as to how the system configuration should be driven. In one path, headed by block 206, hardware information is excluded, resulting in a configuration that chooses hardware based on components. In an alternative path, headed by block 208, hardware information is included and the system allocates components according to the available hardware. This reflects the fact that the coupling values are relative to the targeted network. So while it is possible to model the software's interconnections independent of the hardware capacities, ultimately the hardware has a direct impact on the modularity of the system.

For example, a loosely coupled system running across a backplane turns into a tightly coupled system when running across a LAN. Similarly, a system designed for a LAN may not be supported across a WAN.

TABLE 7

Networks and Their Bandwidths

| Network | Capacity |
|---|---|
| actual WAN instance | 30 bytes/sec |
| fast Ethernet (100 BaseT) | 100 Mbps |
| token-ring | 16 Mbps |
| Ethernet (10 BaseT) | 10 Mbps |

After the choice of including or excluding hardware information has been made, the method then proceeds to calculate couplings (block 210). In one embodiment of the invention, the formulas detailed below calculate the control, data, and peripheral couplings from the domain model.

Figure 3A:
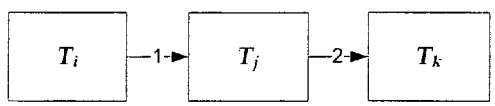
FIG. 3A is a diagram illustrating pipelined vs. nested communication.
Figure 3A:
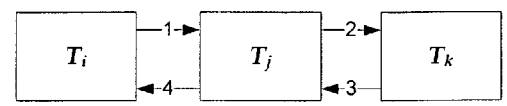

For purposes of analyzing the couplings, the structure of the communication (inter-task and task-data) is assumed to be a pipelined message, which is used to calculate the latency in the couplings. This basic structure represents both control and data flow, with data flow containing a volume of data, while control flow consumes minimal bandwidth. As those of skill in the art will appreciate, modifications of this algorithm easily extend to include the other remote procedure call and messaging structures, at any level of nesting. FIG. 3A illustrates pipelined communication, and nested communication.

The impact on data flow latency of different communication structures, such as rendezvous vs. direct schedule, adds the following calculations:

1. CASE IPC is
   1.1 Rendezvous Output $\{TD_i \rightarrow j\}[LT] = T_i[RST] - D_j[RR]$ 1.2 Rendezvous Input $\{DT_j \rightarrow i\}[LT] = T_i[RST] - D_j[AT]$ 1.3 Direct Schedule Output $\{TD_i \rightarrow j\}[LT] =$ communication constant 1.4 Direct Schedule Input $\{DT_j \rightarrow i\} [LT] =$ communication constant End Case Peripheral I/O specifics are discussed in detail below.

Control couplings are calculated according to the following algorithm: Step 1 calculates the appropriate execution time and processor utilization, Step 2.4 then calculates the control coupling as a combination of calculating: in Step 2.1 the latency, Step 2.2 the timing strength, and Step 2.3 the frequency strength. Step 2.5 then stores this new information into the coupling matrix.

Figure 3B:
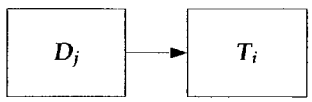
FIG. 3B illustrates input data block access and output data block access
Figure 3B:
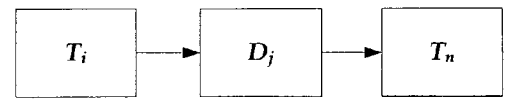

1. For each $T_i$, do:
   1.1 Choose $P_1$ from {default or each available type}
   1.2 Calculate execution time $T_i[ET]$ based on the chosen P1 (single or multiple)
   1.3 Calculate processor utilization $T_i[PU]$ based on the chosen P1 (single or multiple)
2. For each $T_i$, loop through all tasks $(Tn|Ti \rightarrow Tn)$,
   2.1 Calculate the latency for each task coupling, $TT_{i \rightarrow n}[LT]$, (assumes pipelined structure and uniform bus) as:

$TT_{i \rightarrow n}[LT]$ communication constant 2.2 Rank coupling latency, $TT_{i \rightarrow n}[LT]$, against the Timing Step Function to calculate the timing strength for this coupling, $TT_{i \rightarrow n}[TS]$ 2.3 Rank coupling frequency, $TT_{i \to n}[FQ]$, against the Frequency Step Function to calculate the frequency strength for this coupling, $TT_{i \to n}[FS]$ 2.4 Calculate the control coupling as, $TT_{i \to n}[CC] = \max\{TT_{i \to n}[TS], TT_{i \to n}[FS]\} + \{1, \text{if both TS \& FS} > 5 | 0, \text{else}\}$ 2.5 Add the constraint $TT_{i \to n}[CC]$ to the coupling matrix
End The system's data flow contains both task input and output, represented individually to support analysis of the data couplings, and subsequent partitioning and allocation decisions, prior to determining which data blocks are best implemented into messages, shared memory, or databases. FIG. 3B illustrates input data block access and output data block access.

Some embodiments calculate data coupling using the following algorithm: Step 1.5 calculates the data coupling as a combination of calculating: in Step 1.1 the latency, Step 1.2 the timing strength, and Step 1.3 the frequency strength, and Step 1.4 the bandwidth strength. Step 1.6 then stores this new information into the coupling matrix.

1. For each $T_i$ and $D_j$, loop through all data connections ($TD_{i \to j}$ or $DT_{j \to i} | T_i \to D_j$ or $D_j \to T_i$),
   1.1 Calculate the latency for each data coupling, $TD_{i \to j}$ [LT] or $DT_{j \to i}$[LT], (assumes pipelined structure and uniform bus) as:
   $TD_{i \to j}$[LT] or $DT_{j \to i}$[LT]=communication constant
   1.2 Rank coupling latency, $TD_{i \to j}$ [LT] or $DT_{j \to i}$ [LT], against the Timing Step Function to calculate the timing strength for this coupling, $TD_{i \to j}$[TS] or $DT_{j \to i}$ [TS]
   1.3 Rank coupling frequency, $TD_{i \to j}$[FQ] or $DT_{j \to i}$ [FQ], against the Frequency Step Function to calculate the frequency strength for this coupling, $TD_{i \to j}$ [FS] or $DT_{j \to i}$ [FS]
   1.4 Rank coupling data size, $TD_{i \to j}$ [DSize] or $DT_{j \to i}$ [DSize], against the Bandwidth Step Function to calculate the bandwidth strength for this coupling, $TD_{i \to j}$ [BS] or $DT_{j \to i}$ [BS]
   1.5 Calculate the data coupling as,
   $TD_{i \to j}$ [DC] or $DT_{j \to i}$ [DC]=max{TS, FS, BS}+{1, if TS, FS, and BS>5|0, else}
   1.6 Add the constraint $TD_{i \to j}$ [DC] or $DT_{j \to i}$ [DC] to the coupling matrix
End For the purpose of calculating peripheral couplings, peripherals are assumed to be non-processor resources, which may be connected uniquely to a platform or directly on the network. Peripherals such as memory storage devices, sensors, terminals, etc., can be either active or passive. Active input devices are modeled directly as a connection from the peripheral to a task, while passive input devices are modeled as a request from a task to the passive peripheral, then the response from the passive device back to the task (e.g., polling). The passive and active output devices are modeled in a similar fashion. The coupling between a task and a peripheral thus includes any bi-directional communication, but for simplicity the following algorithm assumes unidirectional connectivity.

In the following algorithm, Step 1 calculates the peripheral coupling as a combination of calculating: in Step 1.1 the latency, Step 1.2 the timing strength, and Step 1.3 the frequency strength. Step 1.4 then calculates the coupling strength for each access of a peripheral, and Step 1.5 stores this new information into the coupling matrix.

---

1. For each Ti and Rk, loop through all peripheral-accesses (Ti & Rk | Ti → Rk or Rk → Ti),
   1.1 Calculate the latency for each peripheral coupling, RTk → i [LT] and TRi → k [LT], as:
      1.1.1                       CASE resource-access is
         1.1.1.1                 Input, then
             RTk → i [LT] = (Rk [RST] – Ti [RR])
         1.1.1.2                 Output
             TRi → k [LT] = communication constant
             End CASE

---

1.2 Rank coupling latency, RTk→i [LT] or TRi→k [LT], against the Timing Step Function to calculate the timing strength, RTk→i [TS] or TRi→k [TS]
   1.3 Rank coupling frequency, RTk→i [FQ] or TRi→k [FQ], against the Frequency Step Function to calculate the frequency strength, RTk→i [FS] or TRi→k [FS]
   1.4 Rank coupling data size, TRi→k [DSize] or RTk→i [DSize], against the Bandwidth Step Function to calculate the bandwidth strength for this coupling, TRi→k [BS] or RTk→i [BS]
   1.5 Calculate the peripheral couplings, as,
   RTk→i [CC]=max{RTi→k [TS], RTi→k [FS], RTi→k [BS]}+{1, if TS, FS, & BS>5|0, else}, and
   TRi→k [CC]=max{TRi→k [TS], TRi→k [FS], TRk→i [BS]}+{1, if TS, FS, & BS>5|0, else}
   1.6 Add the constraints RTk→i and TRi→k to the coupling matrix Next, a system executing the method performs pre-partitioning and pre-allocation (block 212). This process takes into consideration the initial requirements that impact the partitioning process. As noted above, pre-partitioning falls into either positive or negative categories. Positive pre-partitioning represents two tasks that must be kept together, independent of where they are allocated, while negative pre-partitioning represents tasks that must be kept separate (usually for redundancy or reliability requirements). Pre-allocation also has positive and negative categories, similarly capturing tasks that are required to be allocated either on or away from, a specific platform. In some embodiments, pre-partitioning and pre-allocation are performed according to the following algorithm:

---

1. For each task Ti:
   1.1   if Ti is positively pre-partitioned with any other Tn
       1.1.1            then create a component containing both tasks
   1.2   if Ti is negatively pre-partitioned with any other Tn
       1.2.1            then store a constraint against both tasks being grouped together
   1.3   if Ti is positively pre-allocated to any Pl
       1.3.1            then allocate Ti to Pl
   1.4   if Ti is negatively pre-allocated to any Pl
       1.4.1            then store a constraint against allocating Ti to Pl

---

Next, a system executing the method interleaves the data and code partitioning (block 214). In a centralized or a client/server system, there is often a single database, or synchronous communication between software and database entities. However, many distributed systems have much more complex patterns of data access. Often each task accesses both local and remote data storage elements, using asynchronous as well as synchronous requests.

The database fragmentation and allocation decisions can be of equal importance to how the software processes are partitioned and mapped, and are interdependent with the process decisions. The location of data entities impacts their accessibility: single or multiple databases, files, cache, messages, replication, etc., all have different performance patterns. Traditionally, the database decisions have been made independently, or alternated with the software allocation at a course level of granularity.

Thus the need to map out software tasks based on their data needs and the database locations, conflicts with the need to map out the database segments and their locations based on the software usage.

Deferring the grouping of the data blocks into databases supports an analysis of the system where the data coupling priorities are interleaved with the task and peripheral coupling priorities. This interleaving is desirable, because it bypasses the recursive problem that has traditionally existed between deciding on data and software locations when they significantly impact each other. Instead, the most strongly coupled entities are grouped together first, irrespective of whether they are data blocks or tasks.

After interleaving, the system executing the method defines and summarizes components within the distributed system (block 216). The partitioning process needs to consider many pieces of information, and an effective technique to manage the tradeoffs is to prioritize their order of evaluation. The bottleneck ratios determine where the system has the least flexibility, and the couplings identify modularity (weak couplings) and cohesiveness (strong couplings).

Together, the ratios and the couplings can be used to drive the order in which the partitioning algorithm should cycle through the information in the coupling matrix, using it to build the components. This order is referred to as the cycle-order.

A simple method for defining the cycle-order used in some embodiments is to choose a sequence of the coupling types, starting with the highest coupling value (e.g., 10) and working down to each type's threshold. The sequence is chosen in priority order, based on the bottleneck ratios. When the first threshold is reached, that type is ignored until the remaining thresholds have been reached.

For example, such a sequence might be: control. 10, peripheral. 10, data. 10, control. 9, peripheral. 9, etc. This works well if the bottleneck ratios are fairly balanced. When the ratios are spread out, the cycle-order could be all of one coupling type from 10 to that specific threshold, then the next type down to the threshold, etc.

As the triples are evaluated, the algorithm creates new components or adds to existing components, as appropriate. The partitioning process can be extended with constraint checking functionality to monitor the hardware capacities of the growing components. This monitoring can be used to flag where a component would overflow a specific capacity, perhaps the smallest memory, or used to prevent the expansion of that component by skipping a triple whose inclusion would cause an overflow.

In some embodiments, a greedy algorithm as is known in the art is used. However, the invention is not limited to greedy algorithms, and other search algorithms can be readily substituted. For example chronological backtracking, could also be incorporated into the heuristics presented here. In some embodiments, component definitions is as follows:

1. Choose thresholds for Control, Data, and Peripheral couplings.
2. Choose cycle-order.
3. Loop through coupling matrix in cycle-order with value from 10 to type.threshold:
   3.1 If matrix cell contains an entry that connects an entity with some entity in one or more existing components, then:
      3.1.1 Choose the entity from current matrix cell with the maximum number of couplings to an already created component,
      3.1.2 Else pick 1st triple.
   3.2 CASE (initiator responder value)
      3.2.1 Neither initiator nor responder is contained in a component:
         3.2.1.1 If capacity constraints are not violated, then:
            3.2.1.1.1 Create a component containing initiator and responder.
            3.2.1.1.2 Calculate Component-Totals.
         3.2.1.2 Else skip triple.
      3.2.2 One of initiator or responder is already in a component:
         3.2.2.1 If capacity constraints are not violated, then:
            3.2.2.1.1 Add initiator or responder into same component.
            3.2.2.1.2 Calculate Component-Totals.
         3.2.2.2 Else skip triple.
      3.2.3 Initiator and responder are grouped into different components:
         3.2.3.1 If capacity constraints are not violated, then:
            3.2.3.1.1 Combine components.
            3.2.3.1.2 Calculate Component-Totals.
         3.2.3.2 Else skip triple.
      3.2.4 Initiator and responder are partitioned into the same component:
         3.2.4.1 Skip triple.
      End Case
   End Loop
4. For all tasks or data-blocks that have below-threshold couplings only:
   4.1 Create a new component to contain each task.
   4.2 For all peripherals that have below-threshold couplings only:
      4.2.1 Group into same component with highest-total of couplings, where constraints are not violated.
   4.3 For all components, calculate Component-Totals.

The results of the partitioning process shows how the tasks and data blocks are partitioned into components, designated Cn. The partitioning algorithm has balanced the tradeoffs based on the known and estimated needs of the distributed system's structure. This process automatically generates components that have a better chance of achieving performance targets than one based either on functional decomposition, or on optimizing one of the performance measures alone.

In addition to defining components, some embodiments of the invention consolidate the original couplings within the component into couplings at the component level, thereby making them easier to work with. This consolidation can consist of summing the totals, and then normalizing again to obtain a range from 1-10. In addition to rolling up the couplings, the total capacity needs of the components themselves are also calculated.

After the components have been defined, the results can be evaluated to determine if the distributed system's configuration is meeting software-engineering standards, such as modularity and cohesiveness, between and within components respectively (block 218). The necessary component interfaces are identified by the intra-component access. These interfaces can then be thoroughly designed, fixed as formal APIs, and accessed via remote procedure calls to support a resilient configuration.

Knowing the estimated modularity and capacities of the software and data components supports the architect's choices of hardware suite. This level of analysis also helps evaluate the quality of the system design. A set of well-modularized system components contains a resilient architecture that easily re-maps to changing hardware suites without requiring changes to the component internals.

If the system executing the method followed the path headed by block 208, i.e. hardware information is included in the model, then the components can be allocated to the hardware (block 222). This allocation process builds on the results of the partitioning process, and maps the components to the hardware. Again, there are several configuration tradeoffs, and using the model and algorithm enables evaluation of the impact of decisions made throughout the developmental lifecycle.

The following greedy algorithm performs the allocation function quickly. Again, the invention is not limited to a greedy algorithm, and those of skill in the art will recognize that other search algorithms, such as chronological back-tracking could also be incorporated into this method.

1. Choose the cycle-order.
2. Loop through all triples by cycle-order:
   2.1 CASE (initiator-component responder-component value)
      2.1.1 Both components are allocated: Skip triple.
      2.1.2 One component is allocated:
         2.1.2.1 If capacity constraints are not violated, then:
            2.1.2.1.1 Allocate new component to same platform as other component.
         2.1.2.2 Else skip triple.
      2.1.3 Neither component is allocated:
         2.1.3.1 Loop through the bottleneck ratios:
            2.1.3.1.1 Find the platform with the most remaining capacity of that ratio into which both components fit.
            2.1.3.1.2 Allocate both components to that platform.
         End Loop
      2.2 If no platform was found, allocate the components separately, based on capacities.
      End Case
   End Loop Alternatively, if the system executing the method followed the path through block 206, in which hardware information is not included in the model, the current state of the model can be used to base hardware choices on the components formed by the previous elements of the method (block 220). Populating the model without hardware details results in a set of software components, generated by the partitioning process, that can be used by an architect to choose a hardware suite.

Next, the system executing the method performs another round of interleaving the data and code allocations (block 224).

Finally, after the actual assignment of components to platforms, the system, in some embodiments, analyzes the load, partitions and/or allocations (block 226). Such an analysis is desirable, because in addition to assisting with the generation of an initial architecture for a distributed system, the method automates the process sufficiently to allow an architect to conduct what-if analysis on a variety of design decisions. The intermediate data available from the partitioning and allocation processes also has considerable value.

Load analysis can be performed by calculating the total loads, by adding both worst case and average cased numbers. This simple calculation clearly shows the predicted performance of each hardware platform and network, as well as providing an overall view of the entire distributed system, including partitions and allocations. Knowing the expected loads assists in evaluating the necessity of adding hardware capacity, or highlights the opportunity to save costs by scaling back on the least-loaded hardware unit. Estimates of significant unused capacity during average load conditions along with spiking worst-case loads identify areas for possible re-design of the software or data entities.

Partition analysis can be performed both initially, and as the development cycle progresses. Many changes may occur to the original estimates that make it desirable to perform partition analysis. Different capacity demands or coupling strengths may easily change how the entities are partitioned into the components, while re-designing the interconnections themselves may be caused by changing system requirements, or attempts to improve the modularity of the distributed system.

The architect or system engineer may conduct what-if evaluations by changing the thresholds to determine the appropriate level of granularity, or modify the model to ensure that the architecture is sufficiently flexible to adapt to new hardware suites or integration with a variety of systems with different performance patterns.

Also, allocation analysis can be performed on the initial model and also subsequent models. The allocation process can support multiple modifications of the model, accompanied by re-analysis of the new situation following the algorithmic procedure detailed above. This process assists the architect in understanding the performance impact of architectural decisions, as well as assisting with other trade-off analyses, such as the performance impact of choosing the platforms based on hardware costs.

As can be seen from the discussion above, given the greedy algorithms used to describe this design method, each of the three main steps, Pre-process, Partitioning, and Allocation, have linear orders of complexity. This effectively supports the architectural analysis of design decisions throughout a distributed system's lifecycle.

The automated methods of the various embodiments of the invention detect potential (conflicting) bottlenecks, provide a satisficing solution to the conflicting goals, and satisfy the most important constraints first. The methods also generate an initial configuration, and scales to realistically complex distributed systems. The methods described above are easily extended to include a non-uniform network structure.

As those of skill in the art will appreciate, software implementing the methods can be written in any of a number of programming languages known in the art, including but not limited to C/C++, Java, Visual Basic, Smalltalk, Pascal, Ada and similar programming languages. The invention is not limited to any particular programming language for implementation.

Application to an Exemplary Distributed System

This section illustrates the process of using the above-described method according to an embodiment of the invention on an example distributed system, showing the actions and their results. This section also communicates the complicated tradeoffs and the variety of details that impact the design decisions, and shows how the volume of information grows as systems scale upward in number of platforms and components.

This section demonstrates the configuration design method with a simplified example of a distributed system, represented at a relatively abstract level of detail. Since distributed systems have complex structures, a 'toy representation' level of detail is used to focus on describing the process. The chosen level shows that this process applies in the early stages of system development, long before it is possible to collect actual timing measurements. To show that this method also applies to re-hosting legacy systems, the exemplary distributed system is a pre-existing system, and application of the method makes estimates of the system details. If in the initial design phase of a real system, this information would represent the architect's known and estimated information. When analyzing legacy systems, the method provides an easy model to follow. The initial information can be obtained from those details that are easily gathered, and actual performance numbers can be collected when more analysis is needed.

Figure 4:
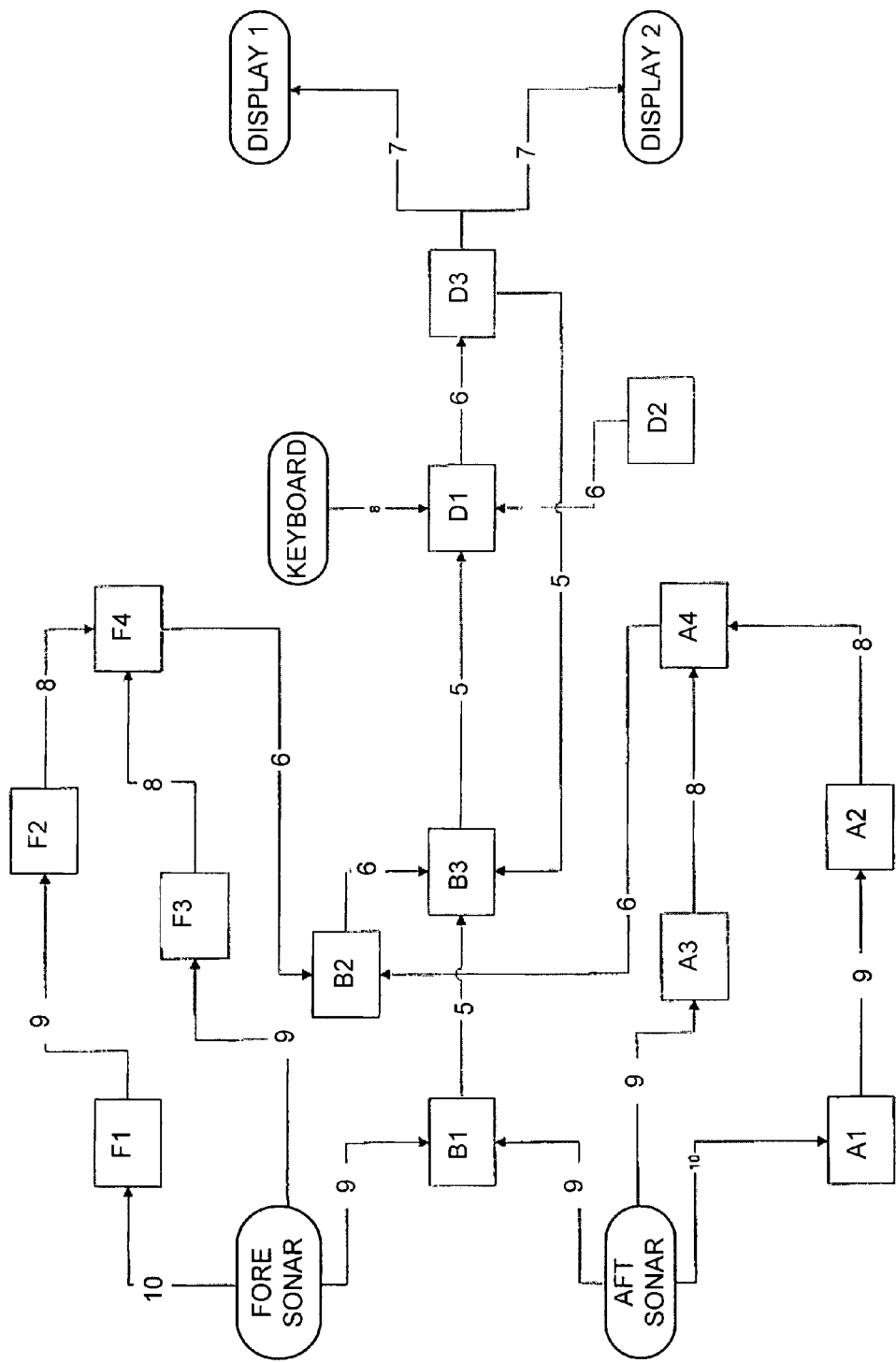
FIG. 4 is a diagram illustrating control and peripheral couplings according to an embodiment of the invention.

FIG. 4 shows an exemplary system that comprises four computers, with a functional partitioning and allocation into four components:

1. Sonar software (processing data from the Fore sensors), Tasks $F_1$-$F_4$ in FIG. 4,
2. Sonar software (processing data from the Aft sensors), Tasks $A_1$-$A_4$ in FIG. 4,
3. Bearing Tracker software, Tasks $B_1$-$B_3$ in FIG. 4, and
4. Display software, Tasks $D_1$-$D_3$ in FIG. 4.

Another system requirement in the exemplary system is that the modules are kept on separate processors, since they provide redundancy for reliability reasons. This is represented in the model as negative pre-partitioning between the individual Fore and Aft tasks, data blocks, and sonar sensors.

The major functional units are two replicated (into Fore and Aft) Sonar modules, a Bearing Tracker module, and a Display module, subdivided (in this example) into a total of fourteen tasks.

For this example, the available information includes the software tasks, data blocks, processors, peripherals, and network links.

The details of each task's processor and memory requirements are shown in Table 8, including utilization percentages for the four available platforms. The percentages are rounded up to the next integer number in this example for simplicity. Overloaded numbers are shown as double dashes (—). This example's memory utilization for secondary memory is close to zero, and thus is not shown here. An extension of this process would include calculating the worst-case task and data-block usage of primary memory, since real-time systems often require a significant amount of cached data to meet their response requirements.

TABLE 8

| | Task Details | | | | |
|---|---|---|---|---|---|
| | Worst Case | Processor Utilization (available mips) | | | |
| Tasks | (est.) mips | P1 (15) | P2 (60) | P3 (70) | P4 (50) |
| F1 | 20 | | 34% | 20% | 40% |
| F2 | 10 | 67% | 17% | 15% | 20% |
| F3 | 10 | 67% | 17% | 15% | 20% |
| F4 | 5 | 34% | 9% | 8% | 10% |
| A1 | 20 | | 34% | 29% | 40% |
| A2 | 10 | 67% | 17% | 15% | 20% |
| A3 | 10 | 67% | 17% | 15% | 20% |
| A4 | 5 | 34% | 9% | 8% | 10% |

TABLE 8-continued

| | Task Details | | | | |
|---|---|---|---|---|---|
| | Worst Case | Processor Utilization (available mips) | | | |
| Tasks | (est.) mips | P1 (15) | P2 (60) | P3 (70) | P4 (50) |
| B1 | 15 | 100% | 25% | 22% | 30% |
| B2 | 25 | | 42% | 36% | 50% |
| B3 | 20 | | 34% | 29% | 40% |
| D1 | 5 | 34% | 9% | 8% | 10% |
| D2 | 5 | 34% | 9% | 8% | 10% |
| D3 | 10 | 67% | 17% | 15% | 20% |

FIG. 4 shows the tasks, control couplings, peripherals, and peripheral couplings. The direction of the arrows represents the direction of control or I/O. The control couplings represent precedence constraints. The control coupling values, shown on each precedence constraint, are initial estimates of the cohesiveness between each pair of connected tasks.

The peripheral couplings are the connections between peripheral devices and tasks, and the values are initial estimates of how strongly a task needs access to a specific peripheral. This information is useful when there are differences in peripheral access among the platforms in the hardware suite. A suite with uniform access would just avoid modeling the peripherals and their couplings. A possible extension of the methods of the invention includes the distinction between active and passive peripherals. At a later stage in the development cycle, these values could be calculated based on frequency, timing, data bandwidth, etc. as discussed with respect to block 210 of FIG. 2, Calculate Couplings.

The data blocks' memory needs, including utilizations of the available processors, are shown in Table 9.

TABLE 9

| | Data Block Details | | | | |
|---|---|---|---|---|---|
| | Worst Case | | | | |
| Data | (est.) | Memory Utilization (available mb) | | | |
| Blocks | mb | P1 (300) | P2 (200) | P3 (1,000) | P4 (1,000) |
| N1 | 600 | | | 60% | 60% |
| N2 | 200 | 67% | 100% | 20% | 20% |
| N3 | 50 | 17% | 25% | 5% | 5% |
| M1 | 600 | | | 60% | 60% |
| M2 | 200 | 67% | 100% | 20% | 20% |
| M3 | 50 | 17% | 25% | 5% | 5% |
| S1 | 100 | 34% | 50% | 10% | 10% |
| S2 | 75 | 25% | 38% | 8% | 8% |
| T1 | 250 | 84% | | 25% | 25% |

Figure 5:
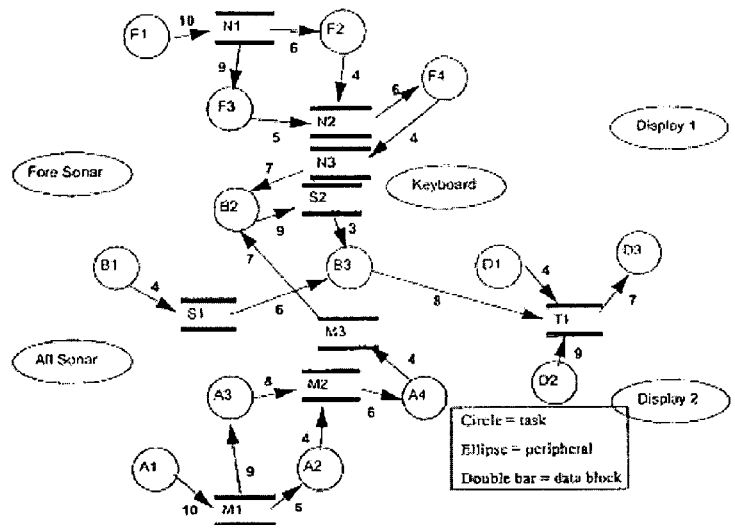
FIG. 5 is a diagram illustrating read and write data couplings according to an embodiment of the invention.

FIG. 5 illustrates the tasks and peripherals, but also shows the data blocks and the data couplings, instead of the control and peripheral couplings. These two figures show separate views only for clarification, both sets of information are interleaved in the algorithmic process. FIG. 5 also adds in the directional dependencies (a read is shown as an arrow from data-block to task; a write is described as the reverse) between the tasks and the data blocks. A task that both reads and writes the same data block has two separate couplings, supporting the description of any differences in frequency, timing, or bandwidth.

Figure 6:
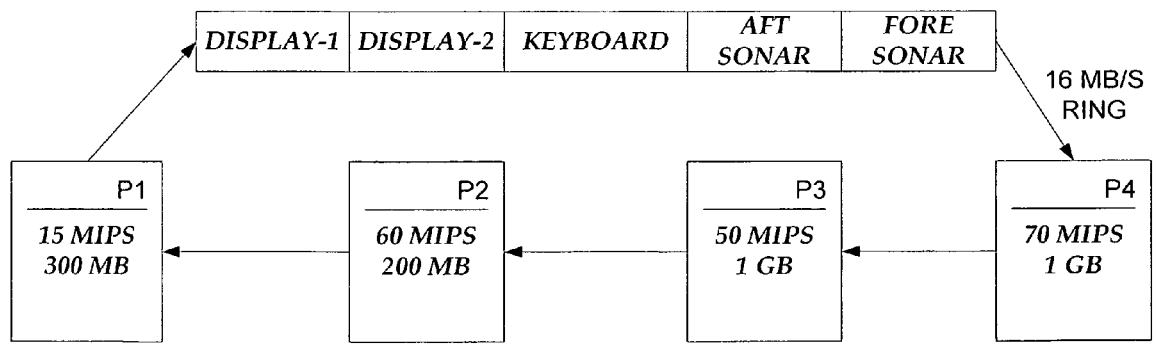
FIG. 6 is a diagram illustrating an initial hardware suite according to an exemplary embodiment of the invention.

The target hardware suite in the exemplary system is illustrated shown in FIG. 6. The exemplary hardware is connected with a ring bus, and has all of the peripherals located on the network at the same point. For this example, processor and memory capacities are known, as are the network bandwidth and latency. This process makes the evaluation of different hardware suites easy, via representation of different platforms, and fine-tunes the results via small changes to the model.

In this example, the processor information specifies heterogeneous CPU and memory capacities. The peripherals are identified by their types (sonar, display, etc.), and are attached directly to the same point in the ring bus. The directional flow of the network, as well as its bandwidth and latency, are known.

Table 10 shows the triples for this example, implemented as a set of three columns (control, data, and peripheral), and ten rows (values 1-10) representing the range of coupling strengths. In Table 10, these thresholds (shown as double lines) are CT=7, DT=5, and PT=3. In this example, the peripheral threshold has no direct impact in the algorithmic process, since the lowest peripheral coupling has a strength of 7.

TABLE 10

Coupling Details

| Strength | Control Couplings | Data Couplings | Peripheral Couplings |
|---|---|---|---|
| 10 |  | (F1 N1 10) | (Fore-Sonar F1 10) |
|  |  | (A1 M1 10) | (Aft-Sonar A1 10) |
| 9 | (Aft-Sonar A3 9) | (N1 F3 9) | (Fore-Sonar B1 9) |
|  | (Aft-Sonar B1 9) | (B2 82 9) | (Aft-Sonar B1 9) |
|  | (A1 A2 9) | (M1 A3 9) |  |
|  | (Fore-Sonar F3 9) | (D2 TI 9) |  |
|  | (Fore-Sonar B1 9) |  |  |
|  | (F1 F2 9) |  |  |
| 8 | (A2 A4 8) | (B3 TI 8) | (Keyboard D1 8) |
|  | (A3 A4 8) |  |  |
|  | (F2 F4 8) |  |  |
|  | (F3 F4 8) |  |  |
| 7 |  | (N3 B2 7) | (D3 Display-1 7) |
|  |  | (M3 B2 7) | (D3 Display-2 7) |
|  |  | (TI D3 7) |  |
| 6 | (A4 B2 6) | (M1 A2 6) |  |
|  | (B2 B3 6) | (M2 A4 6) |  |
|  | (F4 B2 6) | (S1 B3 6) |  |
|  | (D1 D3 6) | (N1 F2 6) |  |
|  |  | (N2 F4 6) |  |
| 5 | (B1 B3 5) | (A3 M2 5) |  |
|  | (B3 D1 5) | (F3 N2 5) |  |
|  | (D3 B3 5) |  |  |
| 4 |  | (A4 M3 4) |  |
|  |  | (B1 S1 4) |  |
|  |  | (D1 TI 4) |  |
|  |  | (F2 N2 4) |  |
|  |  | (A2 M2 4) |  |
|  |  | (F4 N3 4) |  |
| 3 |  | (S2 B3 3) |  |
| 2 |  |  |  |
| 1 |  |  |  |

However, this information indicates that peripheral access is a significant bottleneck, since even a coupling with the relatively weak strength of 3 would be sufficient to prevent (if possible) remote access. As a consequence, different peripheral locations within the hardware suite should be modeled. The next step is to begin the partitioning by creating components from the pre-partitioning requirements, if any. For this example, the only requirements are that the Fore and Aft Sonar entities are kept in separate components, which will be accomplished during the partitioning process. If two or more entities were required to stay together, this step in the automated design process would create an initial component containing them. Any initial components are then expanded upon by the partitioning algorithm described above.

Figure 7:
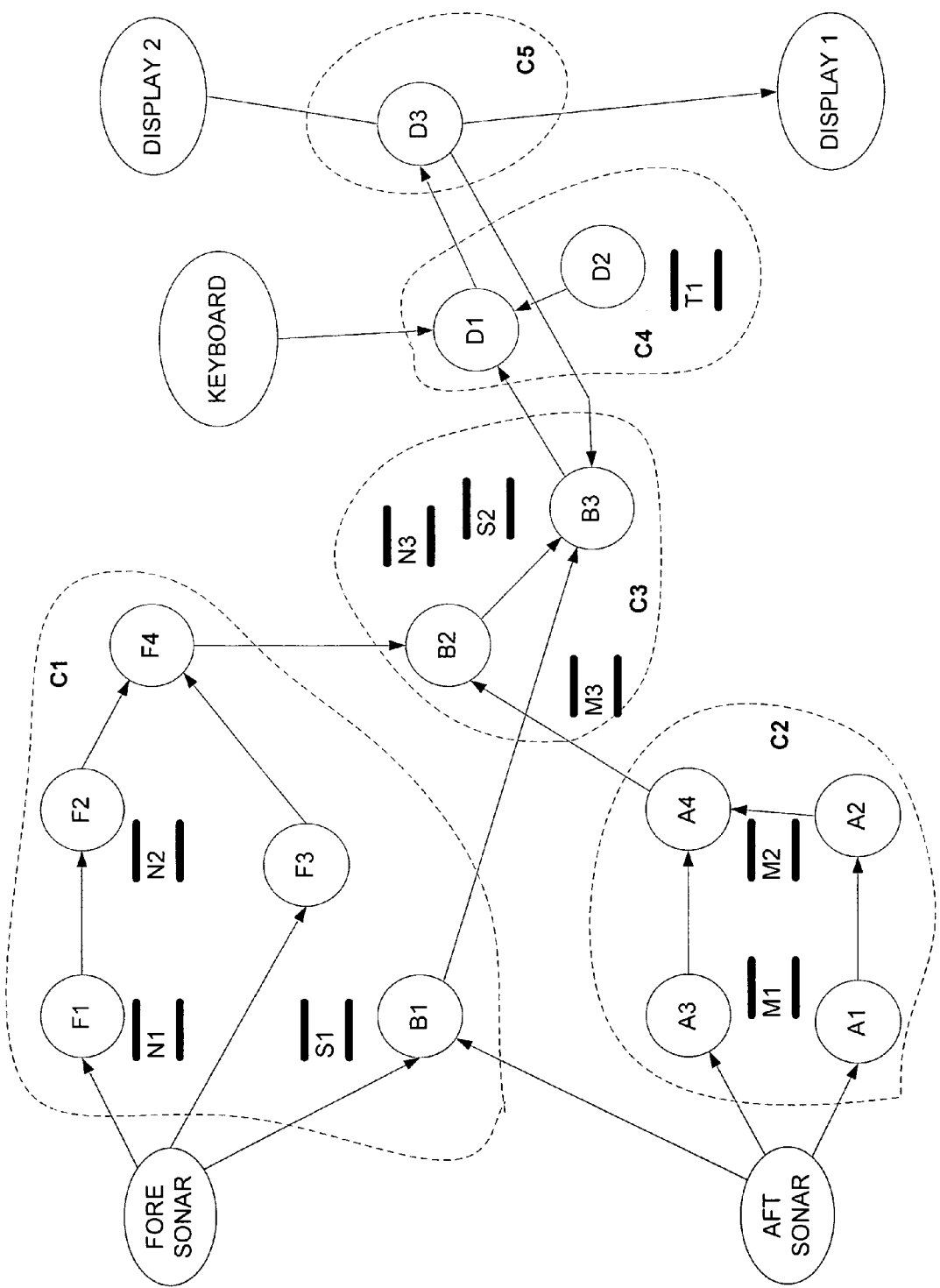
FIG. 7 is a diagram illustrating sets of partitioned components according to an exemplary embodiment of the invention.

Several specific instances of the decision process from the example are demonstrative of the architectural tradeoffs inherent in distributed systems. In FIG. 7, Data Blocks M3 and N3 functionally belong to the Aft Sonar's and Fore Sonar's processing modules, respectively. However, their strongest couplings are with Task B2, part of the calculation module. Therefore M3 and N3 are both grouped into Component C3. The external requirement that the Aft Sonar and Fore Sonar provide redundancy to support reliability causes Tasks A1 and A3 to be grouped separately from Tasks F1 and F3, even though their connection, via the peripheral couplings shared with Task B1, would dictate otherwise. Task B1 has equal connections to the Aft Sonar module and the Fore Sonar module, and its grouping with either Component C1 or C2 is arbitrary.

Functionally, B1 is part of the Bearing Tracker module, but it has much lower couplings to Tasks B2 and B3, and is thus not grouped into Component C3.

Figure 8:
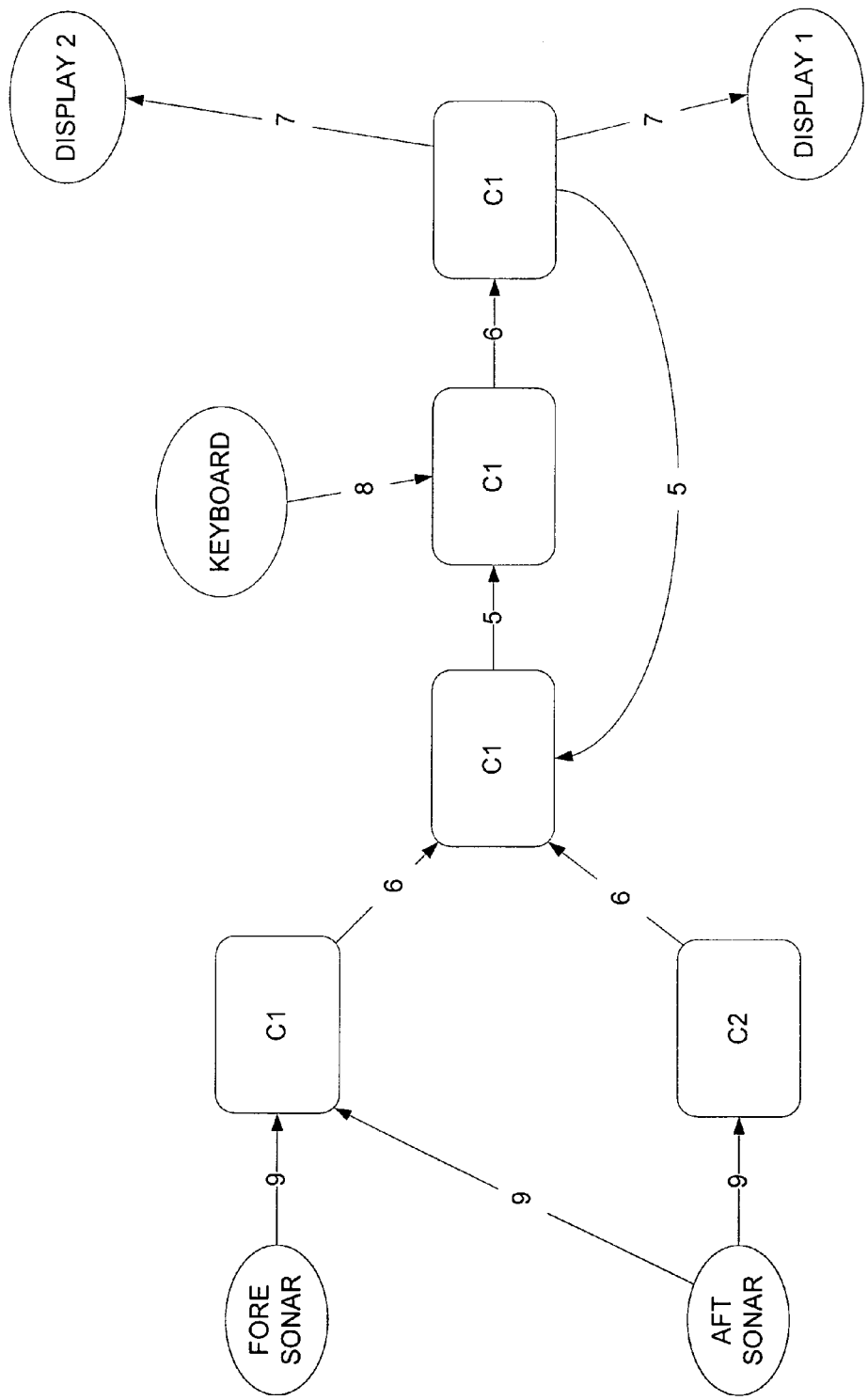
FIG. 8 is a diagram illustrating summarized components according to an exemplary embodiment of the invention.

After the partitioning algorithm completes, the next step is to perform the automatic roll-up process. The resulting view of the distributed system at the partitioned level is shown in FIG. 8. Note that there is a circular path from C3 to C4 to C5 and back to C3. Had all three of these components been grouped together, this circle would have been contained within a component.

A similar calculation results in expected capacity demands for each component. The worst case values are shown in Table 11. Another benefit provided by this view of the distributed system is the ability to postpone hardware decisions until the system's capacity needs are understood with this degree of predictability.

TABLE 11

Component Demands

|  | C1 | C2 | C3 | C4 | C5 |
|---|---|---|---|---|---|
| Worst Case CPU Demand (mips) | 60 | 45 | 45 | 10 | 10 |
| Worst Case Memory Demand (MB) | 900 | 800 | 175 | 250 | 0 |

Figure 9:
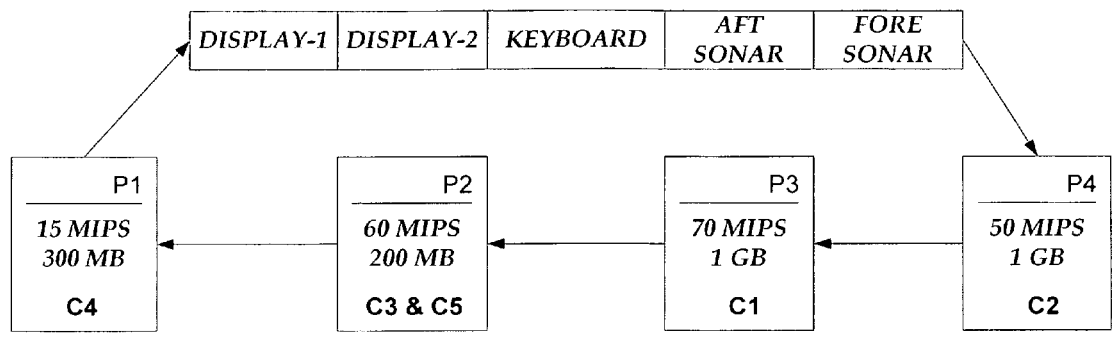
FIG. 9 is a diagram illustrating an allocation of components in an exemplary embodiment of the invention.

The resulting allocation for the example's original estimates is shown in FIG. 9.

The resulting worst case loads are shown below in Table 12.

TABLE 12

Initial Platform Loads

| Platform (Component) | Processor Capacity | Processor Utilization | Memory Capacity | Memory Utilization |
|---|---|---|---|---|
| P1 (C4) | 15 mips | 68% | 300 mb | 84% |
| P2 (C3 & C5) | 60 mips | 93% | 200 mb | 88% |
| P3 (C1) | 70 mips | 89% | 1 gb | 90% |
| P4 (C2) | 50 mips | 90% | 1 gb | 80% |

Several architectural tradeoffs again must be made during allocation. For example, the Components C1 and C2 fill up Processors P3 and P4, respectively. Had these two processors exchanged locations on the ring bus with P1 and P2, there would have been a conflict between allocating C1 and C2 into processors that had sufficient capacity, versus the extra network traffic caused by the additional hops from the input sensors. Also, C1 requires more CPU capacity than C2, due to the inclusion of Task B1. Platform Loads Table 13 shows the resultant loads caused by modifying the platform capacities to combine the original first and second platforms (P1 and P2 are now Px). As shown, Px contains almost 30% more memory than needed for the worst case load, while the CPU loads also have significant excess capacity. These worst case values are calculated to support the required response time, so this may indicate an opportunity to save on hardware costs.

TABLE 13

Modified Platform Loads

| Platform (Component) | Processor Capacity | Processor Utilization | Memory Capacity | Memory Utilization |
| --- | --- | --- | --- | --- |
| Px (C3, C4 & C5) | 80 mips | 82% | 600 mb | 71% |
| P3 (C11) | 70 mips | 86% | 1 gb | 80% |
| P4 (C2) | 50 mips | 90% | 1 gb | 90% |

Figure 10:
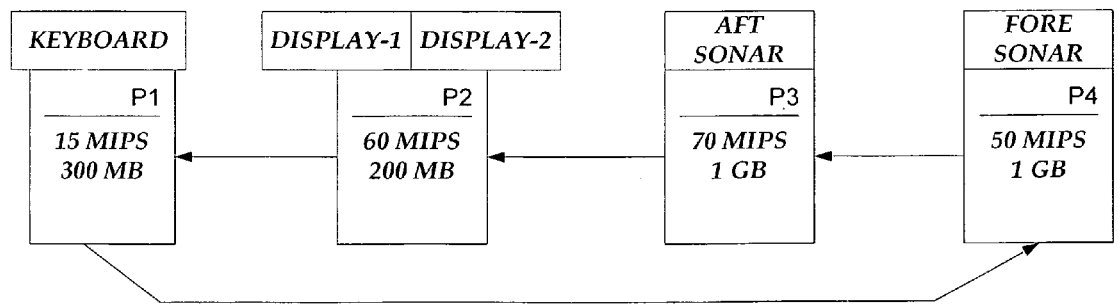
FIG. 10 is a diagram illustrating a modified hardware suite and resulting allocation according to an exemplary embodiment of the invention.

FIG. 10 describes one change that might result from the understanding of the peripheral bottleneck described above with respect to couplings. Now the peripherals are re-located from a single place on a ring bus to direct processor connections. In this analysis, the initial configuration was used to decide that the peripherals needed to be moved. After changing the model to reflect the changed hardware suite, the process then re-evaluated and generated the configuration shown. This confirmed that the change in the hardware suite was appropriate, and illustrates the recursive impact that the partitioning and allocation tradeoffs have.

CONCLUSION

Systems and methods for performing automated partitioning and allocation of components within distributed systems are disclosed. In one embodiment, a method for designing a heterogeneous distributed system's configuration populates a generic, extensible model with the specifics of both the hardware and software elements of the system being designed. This model then drives a partitioning and allocation algorithm that compares the software needs against the hardware capacities, prioritizes based on system bottlenecks, and generates a resulting configuration. By modeling a system to identify both general resource requirements and bottlenecks during the design phase, the result is a configuration based on the actual structure of the software and the capacities of the hardware.

The embodiments of the invention provide advantages over previous systems. Several of the benefits of using the systems and methods of the various embodiments of the invention during the development of a distributed system can include, but are not limited to:

Providing an automated approach to building in or evaluating "quality" of design, based on the design goals Deriving objective coupling/modularity for component boundaries Calculating relative coupling strengths, based on the communication ratio of load to capacity Building a flexible configuration with good modularity Evaluating legacy systems and recommending changes providing estimated answers based on estimated input; it is not necessary to have a complete and detailed description of the distributed system prior to using this method.

providing an automated way of defining the component boundaries, based on modularity and coupling values.

Then, as the system components are actually implemented and measured, the updated details can cause the model to show where any configuration changes result.

Evaluating different hardware suites, interfaces with different external systems, changes in load patterns, etc., can be generated to show the impact on the configuration.

generating a target hardware suite for a specific software application, based on descriptions of available hardware components.

It is not necessary that any particular embodiment include a particular combination of the above benefits.

Although specific embodiments have been illustrated and described herein, it will be appreciated by those of ordinary skill in the art that any arrangement which is calculated to achieve the same purpose may be substituted for the specific embodiments shown. For example, the system and methods illustrated above can be applied to systems performing dynamic allocation of components. Dynamic allocation algorithms determine the placement of components during system execution, based on the actual performance patterns. Because the allocation decisions must be made without introducing significant overhead, dynamic algorithms cannot spend much time computing the tradeoffs. An effective compromise that gains the benefits of both static planning and dynamic adjustment is to statically plan an initial configuration using the systems and methods described above, and also plan out alternate configurations for graceful degradation. These plans can be stored in a table, and a dynamic algorithm used to monitor the running system and respond with re-configurations from the table.

Furthermore, the systems and methods of the invention can be applied to both traditional distributed systems and to object oriented systems.

This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A computerized method for determining an allocation of software and data components in a distributed system, the method comprising:

modeling, the distributed system, the described system having a plurality of computing resources, the computing resources including at least one resource from each of processor resources, memory resources and communications resources;

determining a set of couplings in the distributed system, said couplings including at least one coupling from each of control couplings, data couplings and peripheral couplings;

prepartitioning the set of couplings to produce data and control partitions;

preallocating tasks in each coupling in the set of couplings to one of the at least one processor resource of the plurality of computing resources;

interleaving the data and code partitions;

defining a set of components according to the interleaved data and code partitions, each of the components having a data and a code segment;

determining a modularity of the set of components;

determining a coupling strength for each coupling in the set of couplings; and allocating the defined set of components to computer hardware resources having the computing resources according to the modularity and the coupling strength.

2. The computerized method of claim 1, wherein the set of couplings comprises a control coupling and the coupling strength of the control coupling is determined using a task latency for a task in the control coupling, a timing strength, and a frequency strength.

3. The computerized method of claim 1, wherein the set of couplings comprises a data coupling and the coupling strength of the data coupling is determined using a latency value, a timing strength, a frequency strength, and a bandwidth strength.

4. The computerized method of claim 1, wherein the set of couplings comprises a peripheral coupling and the coupling strength of the peripheral coupling is determined using a latency value, a timing strength, and a frequency strength.

5. The computerized method of claim 1, further comprising:
   calculating bottleneck ratios; and
   ordering evaluations of couplings based on bottleneck ratios.

6. A computer-readable storage medium having stored thereon computer executable instructions for performing a method for determining an allocation of software and data components in a distributed system, the method comprising:
   modeling the distributed system, the distributed system having a plurality of computing resources, the computing resources including at least one resource from each of processor resources, memory resources and communications resources;
   determining a set of couplings in the distributed system, said couplings including at least one coupling from each of control couplings, data couplings and peripheral couplings;
   prepartitioning the set of couplings to produce data and code partitions;
   preallocating tasks in each coupling in the set of couplings to one of the at least one processor resource of the plurality of computing resources;
   interleaving the data and code partitions;
   defining a set of components according to the interleaved data and code partitions, each of the components having a data and a code segment;
   determining a modularity of the set of components;
   determining a coupling strength for each coupling in the set of couplings; and
   allocating the defined set of components to computer hardware resources having the computing resources according to the modularity and the coupling strength.

7. The computer-readable storage medium of claim 6, wherein the set of couplings comprises a control coupling and the coupling strength of the control coupling is determined using a task latency for a task in the control coupling, a timing strength, and a frequency strength.

8. The computer-readable storage medium of claim 6, wherein the set of couplings comprises a data coupling and the coupling strength of the data coupling is determined using a latency value, a timing strength, a frequency strength, and a bandwidth strength.

9. The computer-readable storage medium of claim 6, wherein the set of couplings comprises a peripheral coupling and the coupling strength of the peripheral coupling is determined using a latency value, a timing strength, and a frequency strength.

10. The computer-readable storage medium of claim 6, wherein the method further comprises:
    calculating bottleneck ratios; and
    ordering evaluations of couplings based on bottleneck ratios.

\* \* \* \* \*

UNITED STATES PATENT AND TRADEMARK OFFICE
CERTIFICATE OF CORRECTION

PATENT NO. : 7,747,422 B1  
APPLICATION NO. : 09/688006  
DATED : June 29, 2010  
INVENTOR(S) : Elizabeth Sisley It is certified that error appears in the above-identified patent and that said Letters Patent is hereby corrected as shown below:

In column 28, line 49, in Claim 1, after "modeling" delete ",".

In column 28, line 49, in Claim 1, delete "described" and insert -- distributed --, therefor.

Signed and Sealed this

Twelfth Day of October, 2010

David J. Kappos  
*Director of the United States Patent and Trademark Office*